June 21, 1955 H. J. DUPLANTIS 2,711,046
FISHING REEL
Filed July 23, 1952 2 Sheets-Sheet 1
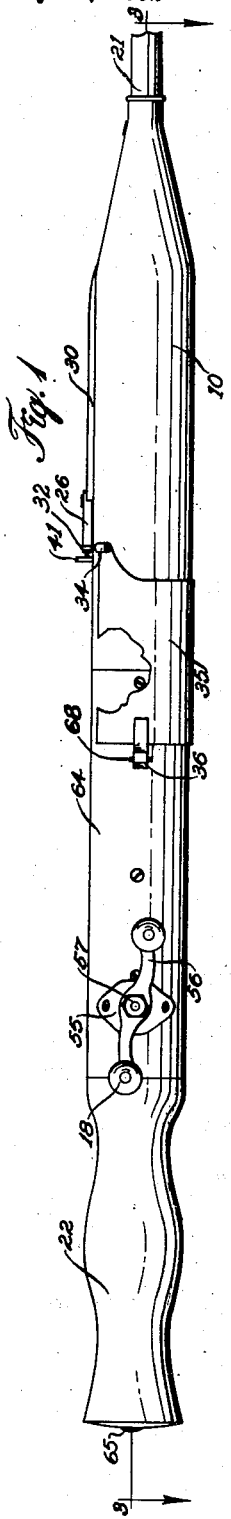
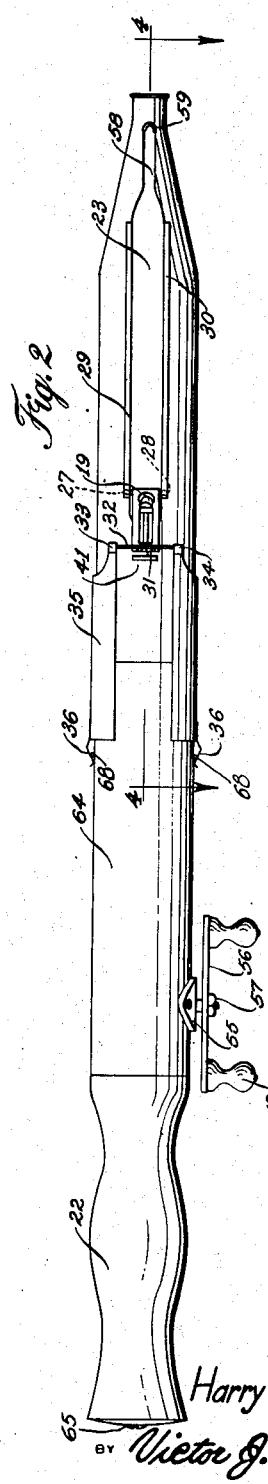
INVENTOR.
Harry J. Duplantis
BY Victor J. Evans & Co.
ATTORNEYS

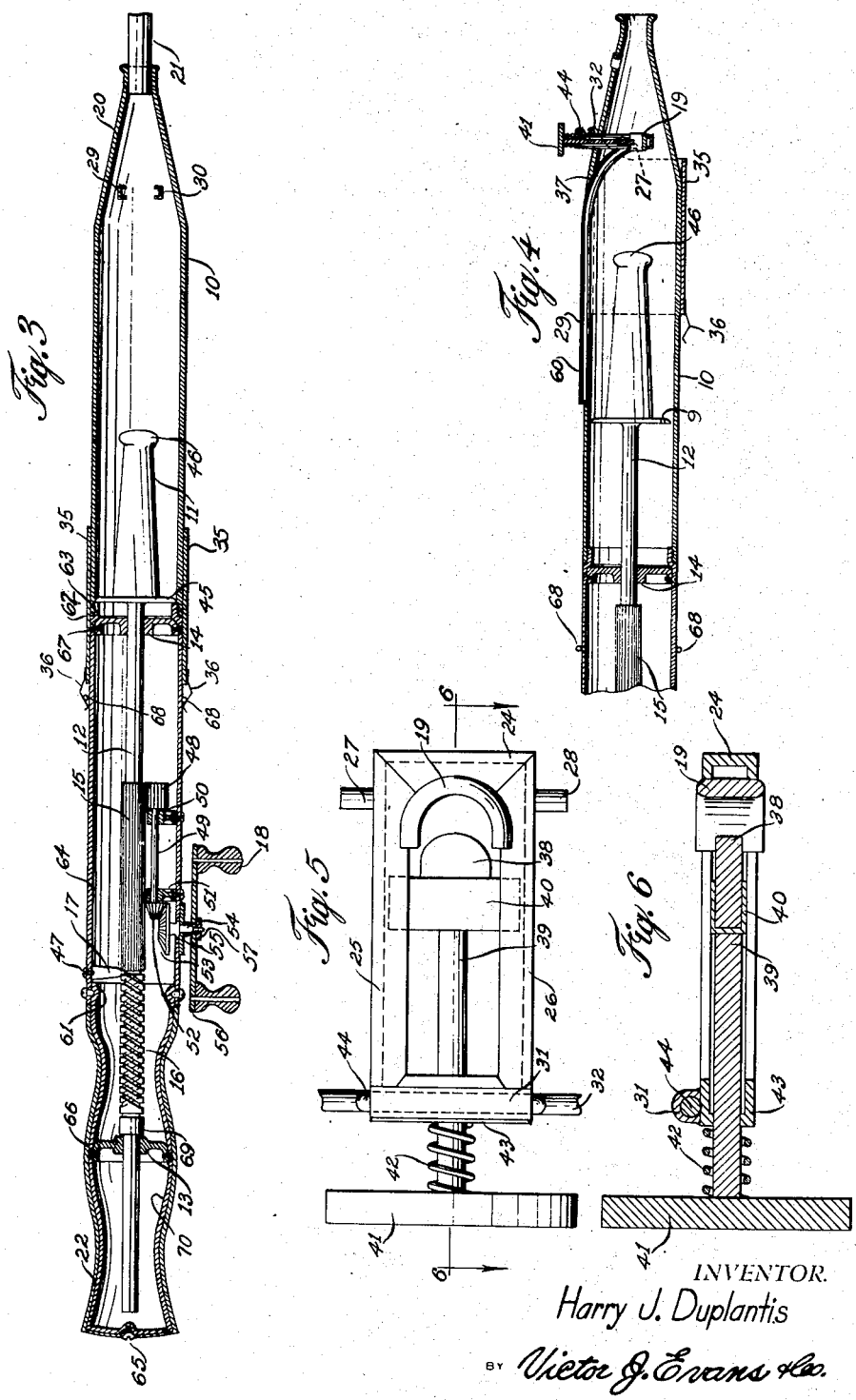

United States Patent Office 2,711,046
Patented June 21, 1955

2,711,046

FISHING REEL

Harry J. Duplantis, Gretna, La.

Application July 23, 1952, Serial No. 300,483

5 Claims. (Cl. 43—20)

This invention is a fishing line reel of the type wherein the reel is incorporated in the handle, and in particular a reel having a reciprocating spindle with a line guide having a brake therein and wherein the spindle is rotated by knobs on one side of a handle in which the spindle is mounted with the knobs rotating a pinion meshing with the sliding gear and with the gear actuating a level wind by which the spindle is reciprocated.

With the conventional type of fishing reel which is mounted on the handle of a fishing rod it is necessary to rotate the reel in casting and in numerous instances the fishing line fouls because the reel travels too fast or too slow, and for this reason various types of reels have been provided wherein the line pays off of the end of the reel or spindle. With this type of reel, however, it is necessary to turn the spindle to an angle of 90 degrees to wind the line in and this requires additional structure that is objectionable in reels for this use. With this thought in mind this invention contemplates a method of operating a reel wherein the reel may be incorporated in the handle of a fishing rod whereby the line is free to pay out from the end of the spindle and wherein the spindle rotates and reciprocates in retrieving the line.

The object of this invention is, therefore, to provide means for forming and operating a fishing line reel whereby with the parts incorporated in the handle of a fishing rod the line pays off of the end of the spindle of the reel and the spindle rotates and reciprocates in retrieving the line as the parts are actuated by knobs rotatably mounted on the side of the handle.

Another object of the invention is to provide means for feeding a fishing line to a rotating and reciprocating spindle incorporated in the handle of a fishing rod whereby friction may be applied to the line passing out from the spindle and wherein the friction applying means or brake is adapted to be actuated to feed the line to a point midway of the longitudinal travel of the spindle in retrieving the line.

A further object of the invention is to provide a fishing rod handle having a reel incorporated therein in which the device is of a simple and economical construction.

With these and other objects and advantages in view the invention embodies a tubular substantially hollow fishing rod handle having a spindle carried by a shaft rotatably and slidably mounted in the handle, having gears actuated by knobs extended from the handle for rotating and reciprocating the spindle and having a guide and brake for feeding the line to the spindle and also for retarding outward movement of the line.

Other features and advantages of the invention will appear from the following description taken in connection with the drawings, wherein:

Figure 1 is a side elevational view illustrating the handle in which the fishing reel is positioned.

Figure 2 is a plan view of the handle showing the line guide in the position of retrieving the line.

Figure 3 is a longitudinal section through the handle taken on line 3—3 of Fig. 1 showing the reel spindle at the inner end of its travel.

Figure 4 is a longitudinal section taken on line 4—4 of Fig. 2 showing the reel spindle in the extended position and illustrating the line guide in the position for paying out the line.

Figure 5 is a detail illustrating the brake in the line guide with the parts shown on an enlarged scale and showing the line guide separated from the handle.

Figure 6 is a longitudinal section through the line guide taken on line 6—6 of Fig. 5.

Referring now to the drawings wherein like reference characters denote corresponding parts the improved fishing line reel of this invention includes a tubular handle 10, a spindle 11 carried on the end of a shaft 12 rotatably and slidably mounted in bearings 13 and 14, a sliding gear 15 positioned on the shaft 12, a level wind 16 also positioned on the shaft 12, a level wind guide 17 mounted in the housing, knobs 18 for rotating a stub shaft 54, gears 15, 48, 52 and 53 which in turning rotate the spindle and a line guide 19.

The tubular casing 10, which forms the handle for a fishing rod is provided with a conical-shaped end 20 in which a rod, as indicated by the numeral 21 may be positioned and a grip 22 is frictionally held on the opposite end.

The casing 10 is provided with an elongated slot 23 through which the line guide extends and, as shown in Fig. 5, the line guide, which is positioned in a U-shaped frame having a base 24 with arms 25 and 26 is provided with pins 27 and 28 that are positioned to travel in guides 29 and 30 at the sides of the slot 23. The U-shaped frame of the line guide is provided with a head 43 at its upper end having an elongated bearing 31 thereon in which a rod 32 is positioned and the ends of the rod 32 are pivotally mounted in hubs 33 and 34 on extensions at one end of a sliding split sleeve 35 that is positioned on the tubular casing 10 of the handle. The sleeve 35 is provided with spring fingers 36 which retain the sleeve in an adjusted position on the handle and, as illustrated in Fig. 4, upon forward movement of the sleeve 35 the pins 27 and 28 travel in arcuate sections, as indicated by the numeral 37 of the rails 29 whereby the frame of the line guide is moved to assume a position perpendicular to the axis of the handle casing 10.

The line guide 19 is U-shaped, as shown in detail in Fig. 5, and an arcuate head 38 on the end of a rod 39 which is held by a slide 40 extends into the line guide 19 to frictionally hold a line passing through the guide in casting. The slide 40 is slidably mounted in the arms 25 and 26 of the frame and the rod 39 extends through the head 43 on which the bearing 31 is positioned.

The rod 39 is provided with a button 41 and a spring 42 positioned on the rod 39 between the button 41 and end 43 of the guide holds the rod with the head 38 as shown in Fig. 5 until the button 41 is pressed inwardly by hand.

The line guide 19 is formed as illustrated in Figs. 5 and 6 and the flanges of the base 24 and arms 25 and 26 are provided with arcuate sections to receive the guide.

The rod 32 is provided with an offset section 44 that is positioned in the bearing 31 and the ends of the rod extend into the hubs 33 and 34, as shown in Fig. 2.

The spindle 11 is provided with a base flange 45 and from the flange 45 the spindle tapers to a head or knob 46 on the opposite end. The spindle is fixedly mounted on the shaft 12 and the shaft is journaled in the bearings 13 and 14 as shown in Fig. 3.

The level wind guide 17 is secured to the casing 10 with a screw 47 and with the point of the guide extended into the cross grooves 16 of the level wind the shaft with the spindle thereon will be reciprocated as it is rotated.

The sliding gear 15 meshes with a pinion 48 on a shaft 49 which is journaled in bearings 50 and 51 and a pinion 52 on the opposite end of the shaft 49 meshes with a gear 53 on a stub shaft 54 that is journaled in a bearing 55 on the wall of the handle. The knobs 18 are carried by a bar 56 that is secured on the end of the stub shaft 54 with a nut 57, as shown in Fig. 1.

With the parts formed in this manner a line positioned on the spindle 11 and with one end of the line connected to the spindle 11 by means of opening 9 and the other end of the line extended through the line guide 19 and also through an opening of reduced size, as indicated by the numeral 58 whereby with the spindle held stationary and with a thumb on the button 41 the line may be released and cast with the button 41 used as a brake to retard outward movement of the line. The end of the opening 58 may be provided with a U-shaped guide or liner 59 to prevent wearing or cutting the line (see Fig. 2).

When it is desired to retrieve the line the sleeve 35 is drawn toward the end of the handle on which the grip 22 is positioned and in this movement the line guide frame moves from a position perpendicular to the axis of the handle to a position parallel to the axis as illustrated in Figs. 1 and 2. With the line guide in this position the line is fed to the spindle at a point, as indicated by the numeral 60, in Fig. 4 whereby with the spindle reciprocated from the position shown in Fig. 3 to that shown in Fig. 4 the line will travel from one end of the spindle to the other as the spindle is rotated.

With the spindle provided with an enlarged knob or head as indicated by the numeral 46, only the outer layers of the line will pass from the spindle in casting.

The tubular casing forming the handle of the fishing rod as indicated by the numeral 10, is adapted to be separated at the points 61 and 62, the casing, as indicated by the numeral 10, being threaded on an annular ring 63 and a tubular portion 70 of the casing 10 is secured in the section 64 at 61. The grip 22 being frictionally retained on the portion 70 the grip 22 having an annular extension adapted to nest into the end of a section 64 of the handle with the end of the grip held by a screw 65 which enters the end of the portion 70.

The bearing 13 is secured by screws 66 in the grip 22 and the bearing 14, by screws 67 in the section 64.

The spring fingers 36 of the sleeve 35 are also positioned to snap over lugs 68 on the outer surface of the section 64 of the casing.

The sliding gear 15 and the level wind 16 formed by an endless threaded member are secured in position upon the shaft 12 with a set collar 69.

It will be understood that modifications, within the scope of the appended claims, may be made in the design and arrangement of the parts without departing from the spirit of the invention.

What is claimed is:

1. A fishing reel comprising a tubular casing providing a fishing rod handle, a reel spindle in the handle and positioned to extend longitudinally thereof, a shaft journalled in said casing and fixed to one end of said spindle, a sliding gear on said shaft spaced from the end on which said spindle is mounted and said shaft being provided with an endless thread thereon outwardly of said sliding gear, a knob, a stub shaft connected to said knob and journaled in the handle and extended therefrom, means in said casing cooperating with said endless thread and said sliding gear for reciprocating and rotating said spindle by the knob, means for feeding a line to the spindle, and a manually actuated brake incorporated in said feeding means.

2. A fishing reel comprising a tubular casing providing a fishing rod handle, a reel spindle in the handle and positioned to extend longitudinally thereof, a shaft journalled in said casing and fixed to one end of said spindle, a sliding gear on said shaft spaced from the end on which said spindle is mounted and said shaft being provided with an endless thread thereon outwardly of said sliding gear, a knob, a stub shaft connected to said knob and journaled in the handle and extended therefrom, means in said casing cooperating with said endless thread and said sliding gear for reciprocating and rotating said spindle by the knob, means for feeding a line to the spindle, a manually actuated brake incorporated in said feeding means, and means slidably mounting said brake and feeding means on the casing whereby the feeding means is adapted to be positioned, selectively, at a point extended beyond the end of the spindle and also at a point positioned at one side of the spindle.

3. In a fishing reel, the combination which comprises an elongated tubular casing providing a fishing rod handle, a longitudinally positioned shaft journaled in the casing and positioned to travel longitudinally therein, a reel spindle carried by one end of the shaft, a knob, a stub shaft connected to said knob and journaled on the handle, gears connecting the stub shaft to the shaft for rotating the same, an endless thread on said shaft adjacent the end of the shaft opposite to that end of the shaft on which the reel spindle is mounted, means in said casing cooperating with the endless thread on the shaft for actuating the shaft longitudinally of the casing upon rotation of the shaft, and a guide mounted to be positioned, selectively at the end of the reel spindle and also at one side thereof for feeding a fishing line to the spindle.

4. In a fishing rod handle, the combination which comprises an elongated tubular casing, a longitudinally positioned shaft journaled in the casing, a reel spindle carried by one end of the shaft, a knob, a stub shaft connected to said knob and journaled in the casing and extended from one side thereof, means connecting the stub shaft to the shaft for rotating the same, an endless thread on the shaft adjacent that end of the shaft opposite to the end on which the spindle is mounted, means in the casing cooperating with said endless thread for actuating the shaft longitudinally as it is rotated, a fishing line guide, and means movably mounting the guide on the casing whereby the guide may be moved selectively, from a position beyond the end of the reel spindle, to a position in which it extends from one side of the spindle.

5. In a fishing rod handle, the combination which comprises an elongated tubular casing, a longitudinally positioned shaft journaled in the casing, a reel spindle carried by one end of the shaft, a knob, a stub shaft connected to said knob and journaled in the casing and extended from one side thereof, means connecting the stub shaft to the shaft for rotating the same, a level wind on the shaft adjacent that end of the shaft opposite to the end of the shaft on which the spindle is mounted, a level wind guide in the casing positioned to coact with the level wind for actuating the shaft longitudinally upon rotation of the same, a fishing line guide, and means movably mounting the guide on the casing whereby the guide may be moved, selectively, from a position beyond the end of the reel spindle, to a position in which it extends from one side of the spindle.

References Cited in the file of this patent

UNITED STATES PATENTS

| Number | Name | Date |
|---|---|---|
| 415,332 | Follett | Nov. 19, 1889 |
| 1,617,543 | Roberts | Feb. 15, 1927 |
| 1,625,988 | Dice | Apr. 26, 1927 |
| 1,955,973 | Norton | Apr. 24, 1934 |
| 2,551,321 | Ferguson | May 1, 1934 |
| 2,561,935 | McCash | July 24, 1951 |

FOREIGN PATENTS

| 444,567 | France | Mar. 4, 1935 |